Sept. 5, 1950 G. ANDREE 2,521,622
CITRUS FRUIT KNIFE
Filed March 18, 1947

INVENTOR.
GUSTAV ANDREE
BY
*Westall & Westall*
ATTORNEYS

Patented Sept. 5, 1950

2,521,622

UNITED STATES PATENT OFFICE 2,521,622

CITRUS FRUIT KNIFE

Gustav Andree, Hollywood, Calif.

Application March 18, 1947, Serial No. 735,415

6 Claims. (Cl. 30—24)

This invention relates to knives, and more specifically contemplates a cutting device operable manually for separating the more edible portions of halved fruit such as grapefruit and the like from the rind and other less esculent parts thereof to facilitate subsequent removal for eating.

In order to sever the pulpy edible sections of grapefruit or the like from the bitter components of the fruit, it is necessary to cut the entire epicarp from the inner juice-laden portions thereof. Knives having blades curved to conform to the contour of the rind have been devised and are suitable for performance of this limited function. However, it is also desirable that the cellular pulp be separated from the pithy membranes dividing the various sections of the fruit. This in the art prior to my invention is ordinarly accomplished as a separate operation by the use of a straight edge knife, the blade being inserted successively on each side of each wall or membrane.

It is a general object in the present invention to provide a knife by which the cellular pulp of citrus fruit and the like may be substantially cut from both the rind and conjunctive tissue by a series of identical operations easily performed by inexperienced persons.

More specifically, it is an object hereof to provide a knife comprising a pair of very thin, flexible and substantially parallel blades adapted for insertion on opposite sides, respectively, of a radially disposed division between fruit pulp sections to be isolated so as to separate the bitter tissue of which the division is composed from both pulp sections, successive uses of the knife on each dividing membrane between sections being thus effective to sever all pulp sections from the several radial divisions.

Another object is provision of a knife consisting of a pair of integral cutting blades disposed in planes forming generally a right angle therebetween, one of the blades being operable for cutting the rind from the pulp segment of the fruit coincidentally with the severance by the complementary part of the knife of the section from an adjoining radial membrane.

Another and highly important object of my invention is the provision of a pair of blades adapted for interposition on opposite sides of a membrane between adjoining pulp sections of a fruit operable to sever the sections from the membrane, and including a lateral, arcuate cutting element associated with one of the blades to cut coincidentally one of the pulp sections from the rind, the second and succeeding serially arranged pulp section thus separated from the less desirable components of the fruit being removable, at the conclusion of the severance of each pulp section, with the cutting element of the knife.

Still another object is to provide a knife having a dual blade assembly supported for manipulation by a common handle wherein one of the blades is formed with a double cutting edge operable to completely sever one side of a pulp section from one of the two opposed membranes to a depth greater than the penetration of the complementary blade so as to assure subsequent severance of the pulp section or so much of it as desired by the second blade incident to the cutting by the latter of the pulp section from the rind and the opposed adjoining membrane.

Still other objects and salient features of my invention, such for example as facility in use, economy of manufacture, effective utility of the blade elements to fruit of various sizes and contours, and durability, will be apparent to those of skill in the art upon an examination of the following description read in the light of the accompanying drawings, in which.

Figure 1:
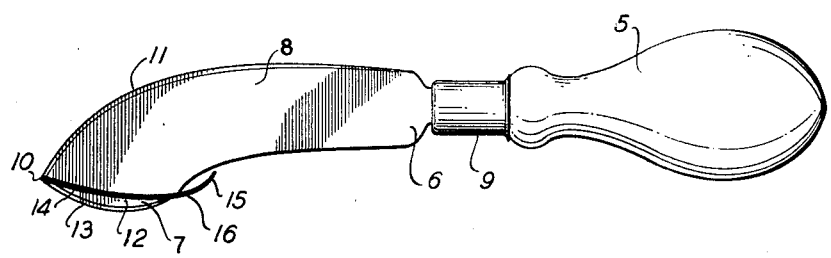
Fig. 1 is a side elevation of a knife embodying my invention.
Figure 2:
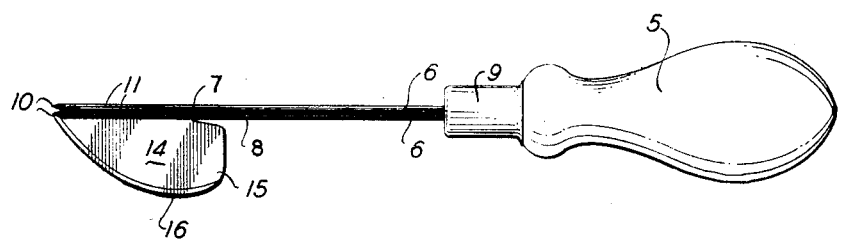
Fig. 2 is a top plan view of the device, illustrating particularly the laterally-projecting cutter.
Figure 3:
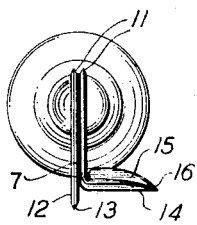
Fig. 3 is a front end view of the knife.

Referring to the drawings more in detail, the numerals of which indicate similar parts throughout the several views, 5 designates generally a handle which may be of any particular form most convenient to fit the hand of the user. One end of handle 5 is reduced in diameter and slotted to receive the ends of the shanks 6 of a pair of arcuate blades 7 and 8. A ferrule 9 fitted over the end of handle 5 reinforces the connection between the blades and handle. Suitable means such as rivets (not shown) are employed to secure the ends of the blade shanks 6 together within handle 5, so as to normally maintain the blades 7 and 8 in parallel and contiguous relationship throughout their length. Each blade terminates in a point 10 offset from the axis of handle 5 with the points of the respective blades equi-distant from the handle. The contours of the upper edges of the blades are identical, each upper edge being sharpened to provide parallel and closely adjacent arcuate cutting edges 11. From the point 10 the lower edge of one of the blades 7 extends arcuately below the corresponding reach of the lower edge of the other blade 8 a short distance for a purpose hereinafter described, returning to transverse alignment with the corresponding reach of the latter blade and continuing parallel with the lower edge of blade 8 to handle 5, thus forming a depending blade segment 12 below the corresponding portion of the complementary blade 8. The edge of the depending segment 12 is sharpened as at 13 throughout its length, i. e., from the point 10 of the blade to the point at which it returns into alignment with the corresponding edge of blade 8.

Integral with the reach of the lower edge of the blade corresponding to the sharpened edge 13 of segment 12 is a laterally-extending blade section 14 which defines a wide arc from end to end. Thus the forward end of blade section 14 is integrally attached to blade 8 at the point 10 of the latter and extends initially downward in a shallow horizontal arc of greater radius than the arc of the cutting edge 13 of the blade segment 12. The blade section 14 is of a length greater than the line of its joinder to blade 8 to form a floating tail portion 15 of sufficient flexibility to follow the contour of the lining of the rind of a halved citrus fruit when the knife is employed as hereinafter described. The lateral edge of the blade section 14 diverges from point 10 arcuately outward, reaching a transverse line through its greatest width slightly forward of tail portion 15, and is sharpened to form a lateral cutting edge 16.

A feature of the knife is the sharply reentering lower edges of the respective blades 7 and 8 immediately rearward of the blade segment 12 and lateral blade section 14 which permit the latter and the cutting edge 13 of segment 12 to follow the contour of the rind of a fruit without limitation or restriction.

The operation and utility of my invention as exemplified in the embodiment thereof depicted in the accompanying drawings, in severing and removing the juice-laden pulp sections of a halved citrus fruit, is briefly described as follows: The points 10 of the two blades 7 and 8 are inserted into the fruit at opposite sides, respectively, of one of the membranes between the adjoining pulp sections adjacent the joinder of the membrane with the rind. The knife is held in a substantially vertical position as this step is initiated to conform to the contour of the upper marginal edge of the rind. As the knife is projected downwardly into the fruit, the angle between the axis of handle 5 and the horizontal plane is gradually reduced so as to direct the lateral blade section 14 between the pulpy fruit segment on one side of the membrane and the rind. The two blades 7 and 8 coincidentally cut the pulp sections on opposite sides, respectively, of the membrane from the latter. Proper direction of the knife contemplates the projection of the points 10 of the blades to the point of intersection between the inner edge of the membrane and the rind, which operation is effective to completely sever the pulp section into which the lateral blade section 14 is directed from the rind and to completely separate the membrane encompassed by the blades from the pulp sections which it normally separates. The knife is then withdrawn through the kerf thus formed, and the operation repeated upon the next membrane, progressing in a counter-clockwise direction around the halved fruit, whereby the pulp section cut from the first membrane over which the knife was directed during the preceding operation is coincidentally cut from the rind and severed from the second membrane of the two flanking its sides. At the conclusion of this cutting operation, which is identical to the first, the pulp section last referred to will be supported upon the lateral blade section 14. Instead of withdrawing the blades through the kerfs thus formed, the knife may be elevated vertically so as to lift the pulp section upon the blade segment from the fruit. The knife is employed in the manner described successively upon each membrane and each pulp section may be immediately recovered without injury to permit its use as an ingredient of salads, fruit cocktails, or the like. The last pulp segment of the fruit is similarly removed by reinserting the lateral blade section 14 thereunder as first above described, the immediately preceding operation, i. e., the use of the knife in effecting the removal of the next to the last pulp section, having resulted in blade 7 cutting the last pulp section from the membrane located clockwise of that membrane first severed.

The cutting of the inner upper portion of each membrane from the pulp sections is assured by the sharp upward bow of the cutting edges 11 from the points 10 of the respective blades 7 and 8.

It will be appreciated that the facility of removal of each of the pulp sections by the lateral blade section 14 depends primarily upon the complete severance of the pulp section by the blade 7 from the membrane previously acted upon. Accordingly, a feature of the knife is the extension of the blade 7 below the lateral blade section 14, i. e., the depending segment 12 of blade 7, which assures the formation of a kerf of greater depth than the depth of the cut effected by the lateral blade section 14 during the following similar manipulation of the knife upon the next membrane.

As hereinabove indicated, the knife blades 7 and 8 are parallel and contiguous with one another throughout their lengths. The thickness of the material of which the blades are composed assures a spacing of the cutting edges of the respective blades and of edge 13 from blade 8 if the blades are sharpened to form bezels on the sides thereof directly opposed to one another. The blades are preferably composed of steel, and, in order to impart the desired degree of flexibility, are quite thin. While the thickness of the blades is somewhat exaggerated in the drawings for illustrative purposes, and the spacing of the corresponding cutting edges 11 and 13 of the blades is too great, it has been found that if the blades are of a thickness corresponding to that of ordinary kitchen knives satisfactory spacing of the cutting edges is accomplished by forming equal bezels on each side of each blade as illustrated.

While I have shown and described but one embodiment of my invention, it will be appreciated that numerous changes in size, design, shape and number of the various parts may be made, that the angle between handle 5 and the blades may be altered to facilitate proper angular disposition and actuation of the cutting edges, that the lateral blade section 14 may be connected to blade 8 at adjacent the point 10 thereof only, so as to increase the flexibility and accordingly the conformity of the blade section 14 to specific utility, and that the angle formed between the edges of the blades diverging from the points 10 may be increased or diminished—all without departing from the spirit of my invention as defined in the appended claims.

What I claim and desire to secure by Letters Patent is:

1. In a device of the character described, a first blade and a second blade, each of said blades terminating in a point and each having an upper arcuate cutting edge diverging from said point, means to hold said blades normally parallel to one another with said cutting edges parallel and closely adjacent to one another, a cutting element connected to said first blade and extending laterally therefrom in a direction forming substantially a right angle with the plane of the blade to which it is attached, said cutting element extending rearwardly from the point of the blade to which it is connected, a second lower cutting edge on said second blade, said upper and lower cutting edges of said second blade extending from said point above and below said lateral cutting element connected to said first blade.

2. In a device of the character described, a flat arcuate blade terminating in a point and having opposed arcuate cutting edges diverging from said point, a second flat blade having an arcuate cutting edge parallel and closely adjacent one of the cutting edges of said first blade, an arcuate cutting element connected to said second blade and extending laterally therefrom in a direction forming a right angle to the plane of the blade to which it is attached, said cutting element having a cutting edge tapering rearwardly and laterally from the point of the blade to which said element is connected.

3. In a device of the character described, a flat arcuate blade terminating in a point and having a cutting edge diverging upwardly from said point, a second flat blade having an arcuate cutting edge parallel and closely adjacent one of the cutting edges of said first blade, and an arcuate cutting element connected to said second blade and extending laterally therefrom in a direction forming a right angle to the plane of the blade to which it is attached, and extending below the parallel cutting edges of said blades, said cutting element having a cutting edge diverging laterally from the point of the blade to which said element is connected, said first-named blade having a second cutting edge diverging downwardly from the point thereof and extending below said lateral cutting element of the second blade.

4. In a device of the character described, a first flat blade terminating in a point, opposite sides of said blade bearing upper and lower arcuate convex cutting edges, a second flat blade terminating in a point and having a cutting edge parallel and adjacent to the upper cutting edge of said first blade, and an arcuate cutting element having its forward end projecting laterally from and connected to said second blade, the forward end of said cutting element terminating in a point coinciding with the point of the blade to which it is attached, the arc of said cutting element being wider than the arc of the lower cutting edge of said first blade.

5. In a device of the character described, a first flat blade terminating in a point, opposite sides of said blade bearing upper and lower arcuate convex cutting edges, a second flat blade terminating in a point and having a cutting edge parallel and adjacent to the upper cutting edge of said first blade, and an arcuate cutting element extending along a line lying intermediate the cutting edges of said first blade and having its forward end projecting laterally from and connected to said second blade, the forward end of said cutting element terminating in a point coinciding with the point of the blade to which it is attached, the arc of said cutting element being wider than the arc of the lower cutting edge of said first blade.

6. In a device of the character described, a first flat blade terminating in a point, opposite sides of said blade bearing upper and lower arcuate convex cutting edges, a second flat blade terminating in a point and having a cutting edge parallel and adjacent to the upper cutting edge of said first blade, and an arcuate cutting element extending along a line lying intermediate the cutting edges of said first blade and having its forward end projecting laterally from and connected to said second blade, the forward end of said cutting element terminating in a point coinciding with the point of the blade to which it is attached, the arc of said cutting element being wider than the arc of the lower cutting edge of said first blade, the rearward end of said cutting element being flexible and movable relative to the blade to which the forward end of said cutting element is attached.

GUSTAV ANDREE.

REFERENCES CITED

The following references are of record in the file of this patent:

UNITED STATES PATENTS

| Number | Name | Date |
|---|---|---|
| 1,115,001 | Merrill | Oct. 27, 1914 |
| 1,226,797 | Newman | May 22, 1917 |
| 1,261,954 | Newman | Apr. 9, 1918 |
| 2,051,680 | Collens | Aug. 18, 1936 |